May 2, 1933.  A. SCHMIDT, JR  1,906,816

SLEEVE SEAL

Filed April 23, 1929

Inventor:
August Schmidt Jr.,
by Charles E. Mullan
His Attorney.

Patented May 2, 1933

1,906,816

UNITED STATES PATENT OFFICE

AUGUST SCHMIDT, JR., OF SCHENECTADY, NEW YORK, ASSIGNOR TO GENERAL ELECTRIC COMPANY, A CORPORATION OF NEW YORK

SLEEVE SEAL

Application filed April 23, 1929. Serial No. 357,517.

This invention relates to a sleeve seal for high current apparatus such as mercury arc rectifiers, hot cathode rectifiers, metal Thyratrons, and the like.

One object of my invention is to produce a new and improved vacuum tight seal for high current apparatus.

Another object of my invention is to construct a glass seal in such manner that the danger of breaking of the glass due to uneven heating and expansion is minimized.

In cases where large currents must be carried it is found that the conducting member of the seal used in the apparatus is heated to a point where the glass frequently cracks. This conducting member becomes very hot due to the high current passing through the conductor, for example, the anode stem in a rectifier, to which it is connected. The glass seal next to the surface of this member is thus heated sufficiently to cause uneven expansion to take place, cracking the glass and thereby breaking the vacuum present in the apparatus.

It is desirable to use as a metal which connects with the conductor of high current carrying capacity and which is in contact with the glass seal, one which is substantially of the same coefficient of expansion as the glass forming the seal and which is "wet" by glass when hot. Chrome iron is ordinarily used because this metal has substantially the same coefficient of expansion as ordinary lead glass and is "wet" by glass when hot. However, due to its high resistance to heat and electricity, the current passing through this metal soon produces the undesirable result above mentioned, namely, causes the seal to break.

Another combination which may be used is molybdenum metal and a glass known as "Libby" glass which has substantially the same coefficient of expansion as this metal.

I have found that if the seal is composed of two concentric pieces of metal with glass between them and designed so that the portion of the inner member in contact with the glass is at a distance from the conductor, for example, the anode stem in a rectifier, this construction will prevent the seal from being unduly heated and from being cracked.

Figure 1:
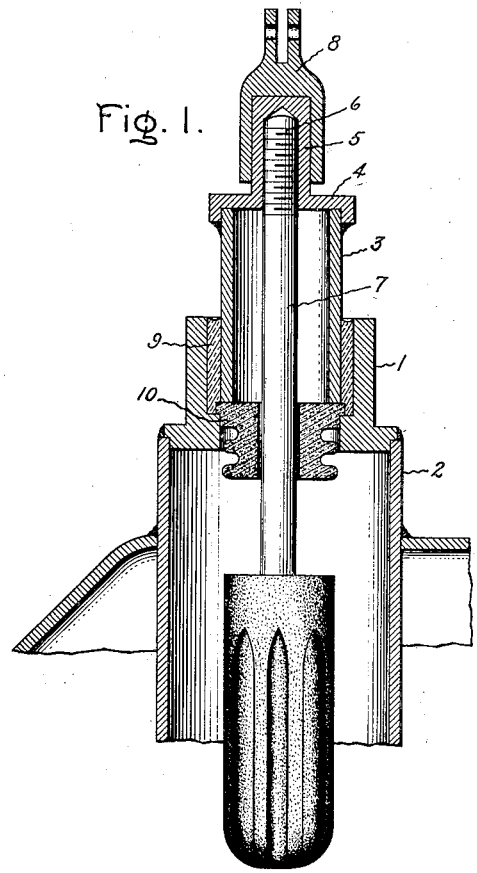
Figure 2:
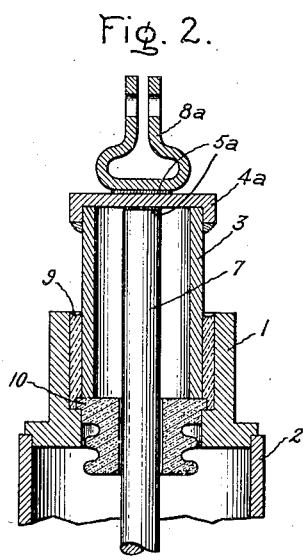
Figure 4:
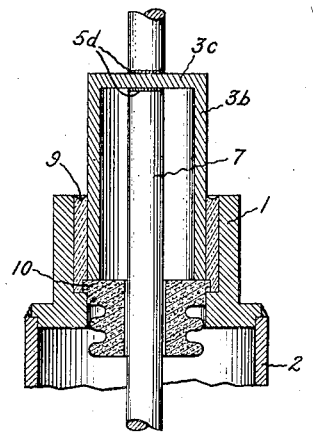
Figure 3:
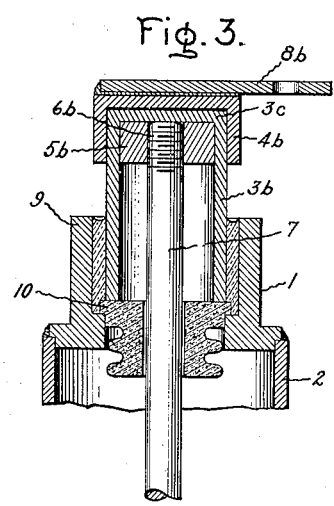

In the accompanying drawing, forming part of this application, Fig. 1 is a cross sectional view in elevation through a preferred form of seal embodying my invention, shown in connection with a portion of a rectifier to which it is applied. Figs. 2, 3 and 4 are cross sectional views of other forms of seals embodying the principles of my invention.

In the form shown in Fig. 1, numeral 1 represents the outer portion or member of my improved seal which may be formed integral with or suitably connected as by welding to the casing or wall 2 attached to or forming a part of a high current apparatus, for example, a rectifier, 3 designating the inner concentric member. The outer member is formed of any suitable metal having a coefficient of expansion greater than that of the glass used, such as machine steel, and is copper coated on the inside thereof so as to present a surface which is "wetted" by glass when hot. The inner member 3 is here shown as having a cap of machine steel 4 welded to the inner sleeve member 3 and having a boss 5 integral therewith, which may be screw threaded to receive the threaded end 6 of the electrode stem 7. Fixed to the boss 5 in any suitable way, as by welding, is the attaching clip or connector 8 made of a good conducting material, such as copper. The inner member 3 is formed preferably of 26% chrome iron but may be formed of any other suitable material. The glass constituting the seal 9 is cast between the two concentric members 1 and 3. The numeral 10 designates a piece of fired soapstone which acts as a spacer and insulator between the outer and inner concentric members 1 and 3 and between the conductor 7, such as the anode stem in a rectifier, and the side wall of the inner sleeve member 3. The inner sleeve member 3 is in the form of a relatively thin hollow cylinder. It will be seen that since the conducting member 7 is attached to the cap 4 a relatively small portion of the inner member of the sleeve will heat up as the heat transferred to the surface of the cap 4 will be largely dissipated and only a small fraction will reach the side wall of the sleeve member 3 to heat the glass seal. This is due to the fact that there is a relatively large surface presented to the surrounding air by the cap member 4 and that there is not a direct path for the heat to be conducted to the glass seal. The heat has a tortuous path to travel in order to reach the surface of the glass. Hence the liability of breaking of the glass seal due to overheating by the large currents passing through the conductor, is minimized considerably, if not entirely eliminated. At the same time a metal, such as chrome iron, which possesses the desirable property of being "wet" by glass and which has the same coefficient of expansion as ordinary lead glass may be used as the inner member of the seal.

The form shown in Fig. 2 is substantially the same as the form shown in Fig. 1 except that the connector 8ª and the electrode stem 7 are butt welded to the machine steel cap 4ª at 5ª.

In the form shown in Fig. 3 there is a further variation in the type of connector used which may be desirable in certain cases. In this form the terminal strip or connector 8ᵇ may be soldered onto the cap 4ᵇ. The cap 4ᵇ may be of copper and soldered onto the hollow concentric inner member 3ᵇ which in this case has a base portion 3ᶜ formed integral therewith. The electrode stem 7, which may be of copper, has a screw threaded end 6ᵇ threaded in a cylindrical plug of copper 5ᵇ suitably joined to the member 3ᵇ.

Fig. 4 shows a simple form suitable for use when no terminal strip or connector is desired directly outside of the seal. In this case the conductor or electrode 7 is butt welded as at 5ᵈ to the base portion 3ᶜ which is formed integral with the inner cylindrical sleeve member 3ᵇ.

While I have shown the seal as applied to a rectifier for the purpose of illustration it is to be understood that it may be applied in practice to any device requiring a seal of this character.

What I claim as new and desire to secure by Letters Patent of the United States is:

1. A seal for high current apparatus comprising concentric inner and outer metallic members, insulation means closing the inner end of the annular space between said concentric members, glass sealed in said annular space in contact with said concentric members and said insulating member, said inner member being formed in the shape of a relatively thin hollow cylinder, an electrode stem connected to the cylinder at a distance from the glass seal, said inner member being composed of a material having substantially the same coefficient of expansion as the glass used for the seal.

2. A seal for high current apparatus comprising concentric inner and outer metallic members having glass therebetween fused thereto to form the seal, said inner member having means for attaching an electrode thereto at one extremity thereof and being of hollow cylindrical shape, a spacing and insulating member surrounding said electrode at the other extremity of said inner member, whereby heating of the glass seal is minimized.

3. A seal for high current apparatus comprising an outer metallic member, an inner metallic member, glass cast therebetween to form the seal, the inner metallic member having means for attaching an electrode thereto at one extremity thereof, and a spacing and insulating member mounted on said electrode at the other extremity of said inner member, said electrode being spaced from the glass seal, whereby a tortuous path from the electrode to the glass is presented to the heat transferred from the electrode to the inner member.

4. A seal for high current apparatus comprising an outer metallic member, an inner metallic member, glass sealed therebetween, an electrical conductor, means for attaching said electrical conductor to a portion of the inner member at one extremity thereof, and a spacing and insulating member mounted on said conductor at the other extremity of said inner member, said conductor being spaced from the glass seal whereby heat transferred from the conductor to the inner member is indirectly conducted to the glass.

5. A cast glass seal for high current apparatus comprising concentric inner and outer metallic members, an insulating member mounted on said outer metallic member and closing the inner end of the annular space between said concentric members, glass cast between said metallic members and in contact with said insulating member thereby forming a seal, said inner member being a relatively thin hollow cylindrical body provided with a base member, said base member forming means for connection to an electrical conductor, said insulating member extending between said outer member and said conductor, the side wall of said inner member being composed of a metal having substantially the same coefficient of expansion as the glass and which is "wet" by glass when hot, and said outer member being composed of a material having a higher coefficient of expansion than said glass.

6. In combination with a high current apparatus, a vacuum tight seal therefor, said seal being composed of inner and outer concentric metallic members, glass between said members to form the seal, said outer member being connected to a portion of a wall of the apparatus, said inner member being in the form of a relatively thin hollow cylinder, an electrode stem connected to the inner member at a point distant from the surface adjacent the glass, and a spacing and insulating member mounted between said concentric members and between said electrode stem and inner member, whereby uneven heating of the glass seal is minimized.

7. A seal for high current apparatus comprising concentric inner and outer metallic members, an insulating member mounted between and in contact with said outer member and the inner extremity of said inner member, glass sealed between said metallic members and in contact with said insulating member, said inner member being formed in the shape of a relatively thin hollow cylinder, and an electrode stem connected to said cylinder at a distance from the glass seal and passing through an aperture formed in said insulating member, said inner and outer metal members having respectively substantially the same coefficient of expansion as said glass used for the seal and a higher coefficient of expansion than said glass.

8. A cast glass seal for high current apparatus comprising concentric inner and outer metallic members, an insulating member mounted adjacent the inner extremities of said metallic members, said metallic members and said insulating member forming an annular space closed at its inner end, and glass cast in said space and sealed between said metallic members and against said insulating member, said inner member being a relatively thin hollow cylindrical body provided with a base member, said base member forming means for connection to an electrical conductor passing through an aperture in said insulating member, the side wall of said inner member in contact with said glass being composed of a metal having substantially the same coefficient of expansion as said glass, said outer member being composed of a metal having a higher coefficient of expansion than said glass.

In witness whereof, I have hereunto set my hand this 22nd day of April, 1929.

AUGUST SCHMIDT, Jr.